Oct. 26, 1965     R. L. BARKLEY     3,214,727
METHOD OF RANGE DETECTION BY USE OF SOUND
Filed Dec. 5, 1962
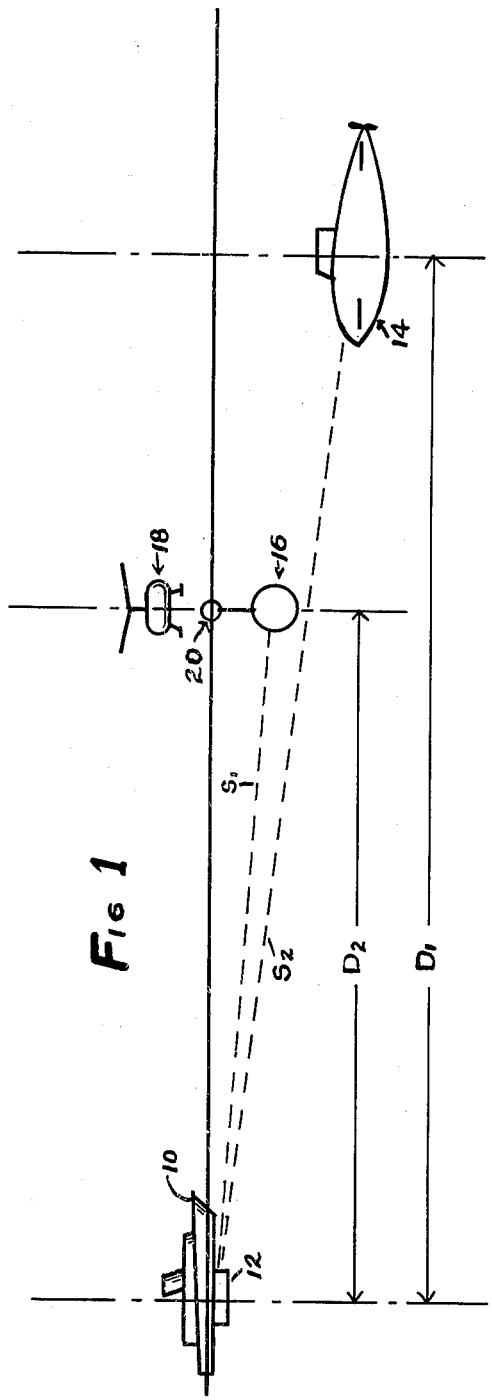
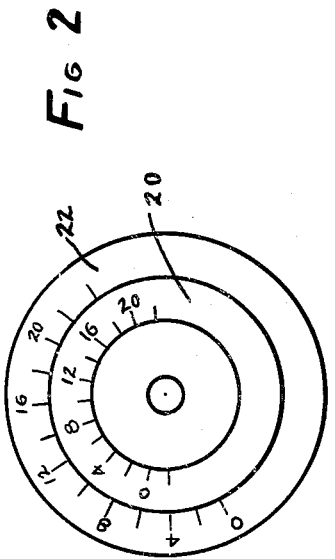
INVENTOR
RICHARD L. BARKLEY
BY Edward B. Gragg 3,214,727
METHOD OF RANGE DETECTION BY USE OF SOUND
Richard L. Barkley, 2281 Byron St., Palo Alto, Calif.
Filed Dec. 5, 1962, Ser. No. 242,520
4 Claims. (Cl. 340—3)

This invention relates to a method of range detection by use of sound and other wave generating equipment and, more particularly, to a method for determining inaccuracies in range and bearing readings of sonar and other wave generating equipment and for correcting such errors to insure greater accuracy in range and directional detection of actual targets.

Underwater sonar ranging equipment which is widely used in the detection and location of submarines and other submerged bodies is subject to inaccuracies and variances as a consequence of varying water conditions. For example, variations in plankton count and movement, the presence and movement of other creatures of the sea, temperature gradients in the water measured both horizontally and vertically, and numerous other factors affect the velocity of sound waves and, hence, may produce inaccuracies in sonar readings, both as to range and bearing.

It is, therefore, an object of this invention to provide a method for detecting sonar and other wave reading inaccuracies resulting from variations from normal of the water conditions.

It is a further object of this invention to provide a method for determining the amount of correction factor to be introduced into the instrumentation in order to compensate for externally produced variations.

In carrying out this invention, I provide for the placement of a secondary target in the water at a precise distance from the detecting ship or in a position wherein the precise range from the detecting ship can be determined by more accurate means, such as radar and visual range and bearing determination methods. The target is then detected on the sonar equipment and any variation of the indicated sonar reading from the known accurate distance is recorded and is either introduced into the sonar electronic or applied to modify the reading determined on the sonar equipment.

Other objects and advantages of this invention will become apparent from the description following when read in connection with the accompanying drawing wherein:

FIG. 1 illustrates the method of this invention graphically; and

FIG. 2 illustrates a means for applying a correction factor into the sonar instrumentation.

Now referring to the drawing with greater particularity, there is shown a detecting vessel 10 carrying sonar equipment for transmission of signals from below the surface of water as indicated generally at 12. At a distance $D_1$ from the detecting vessel is a submerged target represented by the submarine 14 and which can be detected by sonar equipment aboard the detecting vessel by transmission of sonar beams along the line indicated as $S_2$.

As stated above, the velocity of the sound waves or signals along line $S_2$ may be affected by the condition of the water in the area in which the vessels 10 and 14 are operating.

For example, ocean currents may produce varying temperatures and may even produce a temperature gradient from the detecting ship to the target ship. Additionally, the presence and movement of microscopic sea life will have a substantial effect upon the density of the medium through which the sonar beams travel and hence, will effect the readings produced on the detecting ship recording scope. Consequently, the sonar reading resulting from transmission along line $S_2$ may not accurately reflect the range of submerged vessel 14 as $D_1$. It is the purpose of this invention to detect and compensate for such variations and inaccuracies.

In carrying out the method of this invention, a secondary target 16 is placed at a fixed or measurable distance $D_2$ from the detecting ship and in the general vicinity in which the target is presumed to be. Of course, the test method of this invention may be performed in the absence of a known or presumed target and may be employed merely as an advance indication of sonar accuracies in the area in which the detecting ship is operating.

However, since water conditions may vary widely, even in adjacent areas, it is of course more feasible to test sonar accuracy only when there is a specific and immediate need for such accuracy, e.g., when a target is detected in the area.

In any event, the secondary reflector 16 may be placed by any of a number of means including the helicopter 18 or other aircraft launched from the detecting vessel or a companion vessel. Alternatively, the secondary target may be positioned by means of a small boat, by use of rockets or other projectiles that may be placed accurately, or it may simply be dropped by the detecting ship and then its range and bearing measured by any conventional method, such as visual or radar range and bearing system. In some instances, it may be desirable to use a smoke flare or a small gas inflated balloon in conjunction with the secondary target in order to provide a visual or radar reference target. Alternatively, the hovering helicopter 18 or a boat (not shown) that positions the secondary target may serve as the visual target.

Where a suspected target 14 is in the area, the secondary reflector target 16 should be positioned as close as possible to the estimated location of the actual target so that any inaccuracies in the sonar reading will more nearly reflect the proper corrections to be applied at the range and bearing to the actual target. In the case of a test without an actual target, the test should be performed at ranges that are likely to be encountered in actual detecting operations and, preferably, at increments of approximately 2,000 yards.

The type of secondary target employed may take a wide variety of forms just as long as it will produce a satisfactory sonar reflection. For example, the target 16 may be of a collapsible type which extends sound reflective panels or the like and is supported by a gas inflated buoy 20 at a predetermined depth, preferably a depth that would simulate the operating depth of the actual target. If such a buoy is employed, it would be desirable to remove it as a navigational hazard upon completion of the test and, for this purpose, it may be equipped to sink after a period determined by a soluble plug in the buoy (not shown).

Other substances that may satisfactorily be employed as secondary reflectory targets would include a cloud of particles capable of reflecting sound waves such as metal shot or even glass beads that may be dropped in the target area. The secondary target may also be developed by chemical means such as sodium bicarbonate pellets or other materials which produce effervescence in the water, such as the "pillenwerfer" used by the German submarine force in World War II. Of course, the size of the chemically produced secondary target would be determined by the size and number of the pellets used. Finally, the secondary target may simply be another ship or a buoy situated at a known distance from the detector ship.

In carrying out the method of this invention, the secondary reflector target is placed in the water at a known location or at a location that may be determined exactly by the visual or radar range and bearings. The secondary target is then detected on the sonar equipment and the readings produced thereby recorded. Then, the readings may be compared with the actual, known distance in order to determine the error produced by ambient conditions. Once the error is determined, it may be introduced into the sonar equipment, as for example, by adjusting the position of the sonar scope indicator so that the error will be compensated in subsequent readings. In the form shown in FIG. 2, the sonar scope is provided with a rotatable scale surrounding the regular scale 20. Thus, the outer scale 22 may be turned so that the amount of the detected error is added to, or subtracted from the zero reading on the regular scale 20.

For example, suppose the distance $D_2$ of the secondary target 18 or 20, as determined by radar, is found to be 12,000 yards and the distance determined on sonar equipment along sight line $S_1$ to secondary submerged target 16 is found to be 10,000 yards. Therefore, it is apparent that at the range and bearing over which the readings are made there is an error of minus 2,000 yards and hence, this distance must be added to sonar readings in that area and at that approximate range in order to correct them. Then, if the sonar reading to the actual target along line $S_2$ is indicated at 12,000 yards the correction may be applied and the actual target accurately located at a range of 14,000 yards. If the device of FIG. 2 is employed, the error of 2,000 yards may be introduced into the system by rotating the outer scale to place the 2,000 index in line with the zero on the regular scale. Then, when the actual target 14 is detected, the outer scale may be read directly. Under certain circumstances it may be necessary to repeat the operation and determine a second estimate of error.

While I have described my invention in connection with a preferred method of performing the calibration tests, it is apparent that modifications and changes therein may be made by those skilled in the art without departing from the spirit and scope of this invention which is defined by the claims appended hereto.

Having described my invention, I claim:

1. A method of detecting the range and bearing of a submerged target from a detecting vessel comprising the steps of:
   submerging a test target capable of reflecting sound waves in the area of a suspected target,
   providing an associated test target above the surface of the sea over said test target,
   measuring the range of said associated target from said detecting vessel,
   transmitting sonor waves from sonar equipment carried by the detecting vessel and determining the indicated range of said submerged test target as represented by said sonar equipment,
   scanning the area of said suspected target by use of said sonar equipment to determine the indicated range and bearing thereof as represented by said sonar equipment, and
   modifying said indicated range of the suspected target in accordance with the difference between the measured and the indicated range of said test target above the surface of the sea and said submerged test target, respectively.

2. A method of detecting range and bearing of a submerged target from a detecting vessel comprising the steps of:
   submerged a test target in the area of a suspected target,
   said test target comprising a cloud of particles capable of reflecting sound waves,
   providing an associated target above the surface of the sea over said test target,
   measuring the range of said associated target from said detecting vessel,
   transmitting sonar waves from sonar equipment carried by the detecting vessel and determining the indicated range of said submerged test target as represented by said sonar equipment,
   scanning the sub-surface zone of said suspected target by use of said sonor equipment to determine the indicated range and bearing thereof as represented by said sonar equipment, and
   modifying said indicated range of the suspected target in accordance with the difference between the measured and the indicated range of said associated target and said submerged test target, respectively.

3. The method defined by claim 2 wherein:
   radar is employed as a means of measuring the range of said associated target.

4. A method of testing the accuracy of sonar equipment aboard a detecting vessel comprising the steps of:
   submerging a test target capable of reflecting sonar waves, providing an associated test target above the surface of the sea over said test target, measuring above the surface of the sea the range from said detecting vessel to said associated test target, and
   transmitting sonar waves from said sonar equipment aboard said detecting vessel and determining the indicated range of said test target as represented by said sonar equipment for comparison with said measured range.

References Cited by the Examiner

UNITED STATES PATENTS

| | | | |
|---|---|---|---|
| 2,519,825 | 8/50 | De Ment | 343—18 |
| 2,869,108 | 1/59 | Smith | 340—2 |

OTHER REFERENCES

"Supersonic Sounder Simplifies Underwater Surveys," Railway Engineering and Maintenance, December 1949 (pp. 1180–1183 relied on). (Copy in Scientific Library.)

"Sonar and Radar to Help Drill Through Earth's Crust," Electronics, vol. 33, No. 52, Dec. 23, 1960 (p. 34 relied on). (Copy in Scientific Library.)

CHESTER L. JUSTUS, *Primary Examiner.*

LEWIS H. MYERS, *Examiner.*